United States Patent
Li

(10) Patent No.: US 12,158,261 B1
(45) Date of Patent: Dec. 3, 2024

(54) CONNECTION ARRANGEMENT FOR POWER SUPPLY AND POWER WIRE OF SPLIT TYPE HEADLAMP

(71) Applicant: Wenjie Li, Guangdong (CN)

(72) Inventor: Wenjie Li, Guangdong (CN)

( * ) Notice: Subject to any disclaimer, the term of this patent is extended or adjusted under 35 U.S.C. 154(b) by 0 days.

(21) Appl. No.: 18/611,122

(22) Filed: Mar. 20, 2024

(30) Foreign Application Priority Data

Jan. 29, 2024 (CN) .......................... 202420216307.4

(51) Int. Cl.
*F21V 23/02* (2006.01)
*F21V 21/08* (2006.01)
*F21V 21/084* (2006.01)
*F21W 111/10* (2006.01)

(52) U.S. Cl.
CPC ........ *F21V 23/023* (2013.01); *F21V 21/0816* (2013.01); *F21V 21/084* (2013.01); *F21W 2111/10* (2013.01)

(58) Field of Classification Search
CPC .. F21V 21/0885; F21V 21/088; F21V 21/084; F21V 21/0816; F21V 23/023; F21V 23/001; F21W 2111/10
See application file for complete search history.

(56) References Cited

U.S. PATENT DOCUMENTS

| | | | | |
|---|---|---|---|---|
| 8,899,774 | B2* | 12/2014 | Strong | A61B 5/6814 362/572 |
| 11,746,999 | B1* | 9/2023 | Ernst | F21V 23/0421 362/105 |
| 2013/0250593 | A1* | 9/2013 | Popper | F21L 4/005 362/105 |
| 2019/0390844 | A1* | 12/2019 | Sedlacek | F21V 21/084 |
| 2020/0248896 | A1* | 8/2020 | Gall | F21L 4/04 |

FOREIGN PATENT DOCUMENTS

CN 116896147 A 10/2023

OTHER PUBLICATIONS

Innovation Q+ NPL Search (Year: 2024).*

* cited by examiner

*Primary Examiner* — Anabel Ton

(57) ABSTRACT

The present disclosure relates to connection arrangement for a power supply and a power wire of a split type headlamp, including a headlamp, a headlamp band, the power supply, the power wire, and a fixed holder, wherein the power supply is provided with a power supply port and a clamping slot, a first end of the power wire is connected to the headlamp, an elastic buckle is disposed at an outer side of a second end of the power wire, and the elastic buckle can cross the fixed holder and then snap into the clamping slot. The present disclosure mainly uses the elastic buckle and clamping slot to fix the power wire, power supply and fixed holder together, and locks the connection relationship thereof through the elastic buckle and clamping slot, which maintains a stable connection between the power wire and the power supply to keep power flowing.

10 Claims, 5 Drawing Sheets

CONNECTION ARRANGEMENT FOR POWER SUPPLY AND POWER WIRE OF SPLIT TYPE HEADLAMP

CROSS REFERENCE TO RELATED APPLICATION

This application claims priority benefit of Chinese patent Application No. 202420216307.4, filed on Jan. 29, 2024, and the entire contents of which are incorporated herein by reference.

TECHNICAL FIELD

The present disclosure relates to the technical field of headlamp holders, and more particularly relates to connection arrangement for a power supply and a power wire of a split type headlamp.

BACKGROUND

At present, the structure of a split type headlamp on the market includes three major parts: a headlamp, a power wire, and a power supply. In order to ensure the endurance performance, such headlamp is generally equipped with a high-power power supply, which may be fixed or replaceable. The fixed power supply is non-replaceable, has a larger volume, and is heavier, so a trade-off needs to be consider in terms of headlamp performance and wearing experience. The replaceable power supply requires a larger installation and locking structure, which is connected to the power wire by means of contacts, thus being larger in volume, heavier, and poor in waterproof effect. Therefore, how to guarantee energy supply while minimizing the head load under the condition of reducing the weight of the structure has become a technical difficulty that the split type headlamp needs to overcome urgently.

SUMMARY

The technical problem to be solved by the present disclosure is to provide connection arrangement for a power supply and a power wire of a split type headlamp in view of the above-mentioned shortcomings.

In order to solve the above technical problems, the present disclosure adopts the following technical solutions:

Connection arrangement for a power supply and a power wire of a split type headlamp includes a headlamp, a headlamp band, the power supply, the power wire, and a fixed holder, where the headlamp and the fixed holder are both disposed on the headlamp band,
- the power supply is provided with a power supply port and a clamping slot, the power supply is detachably disposed on the fixed holder,
- the fixed holder is provided with a through hole,
- a first end of the power wire is connected to the headlamp, a second end of the power wire can be in a detachable connection with the power supply port after passing through the through hole, an elastic buckle is disposed at an outer side of the second end of the power wire, and the elastic buckle can cross the fixed holder and then snap into the clamping slot.

Further, the fixed holder includes a base and a fixed frame, the base is disposed on the headlamp band, the fixed frame is disposed on the base, the power supply is detachably disposed inside the fixed frame, and the through hole is reserved in the fixed frame.

Further, elastic clamping portions are provided on both sides of a middle part of the base, and the elastic clamping portions are configured to fix a battery in the fixed frame.

Further, the fixed frame includes a first half frame and a second half frame, and the first half frame and the second half frame are disposed on the elastic clamping portions.

Further, a power supply port fixing position is provided on the first half frame, and the through hole is reserved in a middle part of the power supply port fixing position.

Further, a first hollow hole is formed in the elastic clamping portions, and a plurality of connecting rods are disposed inside the first hollow hole; and outer frames of the elastic clamping portions and the connecting rods form a plurality of triangular-like frame structures.

Further, the outer frames of the elastic clamping portions are in triangular-like shapes.

Further, the base is provided with a plurality of second hollow holes.

Further, two connecting buckles are disposed on an outer side of the base, and the connecting buckles are configured to achieve a connection with the headlamp band.

Further, a mounting groove is formed at the outer side of the second end of the power wire, the elastic buckle is disposed on a fixing sleeve, and the fixing sleeve is matched with the mounting groove.

After adopting the above technical solutions, the present disclosure has the following advantages compared with the prior art:

The present disclosure mainly uses the elastic buckle and clamping slot to fix the power wire, power supply and fixed holder together, and locks the connection relationship thereof through the elastic buckle and clamping slot, which not only maintains a stable connection between the power wire and the power supply to keep power flowing, but also prevents battery displacement and deformation within the fixed holder; and furthermore, the number of components is reduced while ensuring stability, achieving a lightweight structure.

Due to the arrangement f the fixed holder of the present disclosure, the volume of the present disclosure is minimized through a hollow-carved design while ensuring rigidity, thus realizing light weight, and reducing the head load of a wearer.

The end of the power wire connected to the power supply port is locked by means of the elastic buckle, the clamping slot, and the power supply port fixing position, which is more stable than the common contact power supply method on the market and facilitates waterproof treatment, effectively ensuring the working stability of the connecting devices.

The present disclosure will be described in detail below with reference to the accompanying drawings and embodiments.

Figure 1:
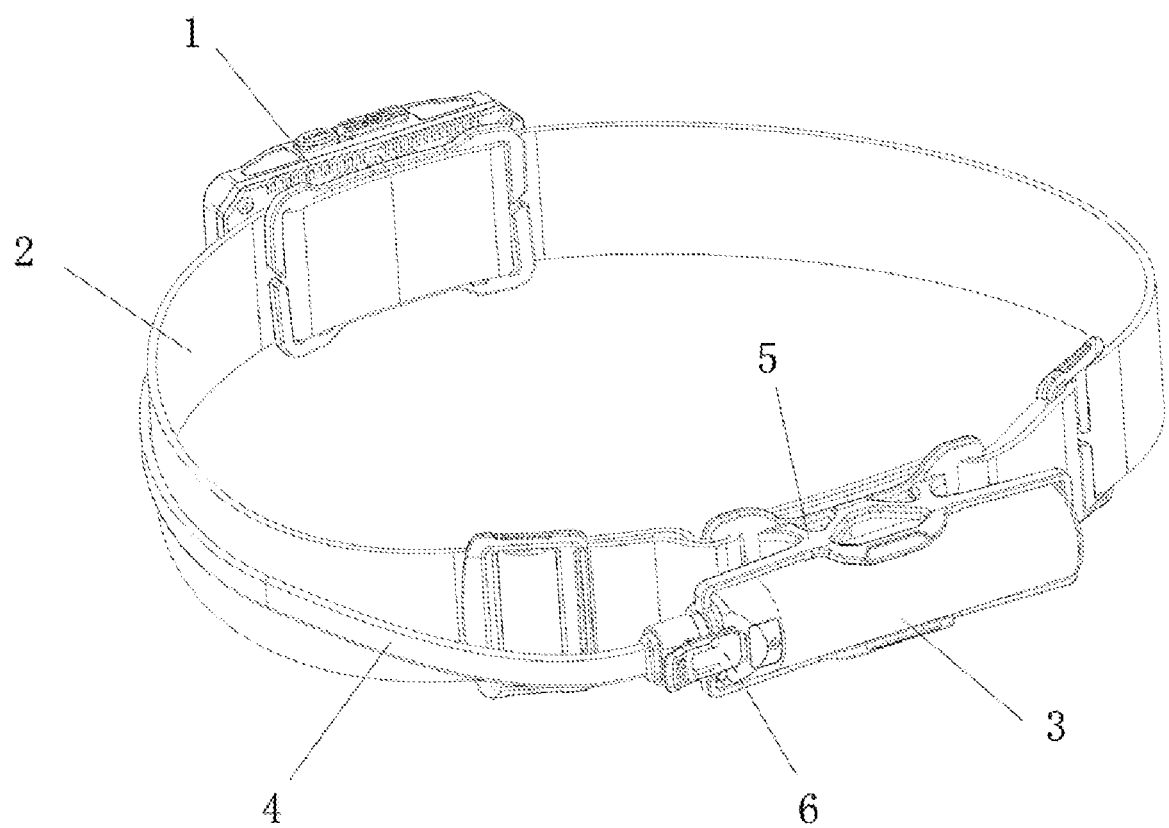
FIG. 1 is a schematic diagram of the overall structure of an embodiment of the present disclosure.

In the drawings, the list of components represented by the reference numerals is as follows:

1 denotes a headlamp; 2 denotes a headlamp band; 3 denotes a power supply; 31 denotes a power supply port; 32 denotes a clamping slot; 4 denotes a power wire; 41 denotes a mounting groove; 5 denotes a fixed holder; 5a denotes a through hole; 51 denotes a base; 511 denotes second hollow holes; 512 denotes connecting buckles; 52 denotes a fixed frame; 521 denotes a first half frame; 522 denotes a second half frame; 523 denotes a power supply port fixing position; 53 denotes elastic clamping portions; 531 denotes a first hollow hole; 532 denotes connecting rods; 6 denotes an elastic buckle; and 61 denotes a fixing sleeve.

DETAILED DESCRIPTION OF THE EMBODIMENTS

The principles and features of the present disclosure are described below in conjunction with the accompanying drawings, and the examples provided are only intended to explain the present disclosure, not to limit the scope of the present disclosure.

In the description of the present disclosure, it should be noted that the orientations or positional relationships indicated by the terms "center", "upper", "lower", "left", "right", "vertical", "horizontal", "inner", "outer", "clockwise" and "counterclockwise" are based on the orientations or positional relationships shown in the drawings, which are only for the convenience of describing the present disclosure and simplifying the description, rather than indicating or implying that the means or elements referred to must have a particular orientation, or be constructed and operated in a particular orientation, and therefore it should not be understood as a limitation of the present disclosure.

Figure 2:
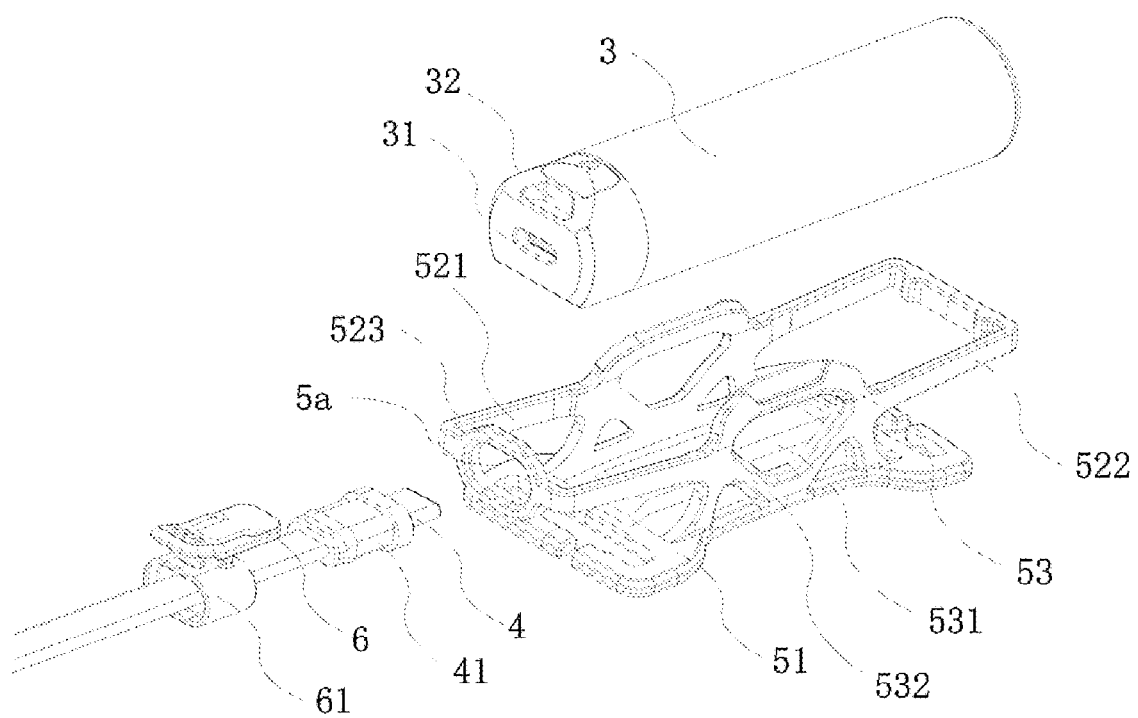
FIG. 2 is an exploded view of an embodiment of the present disclosure.
Figure 3:
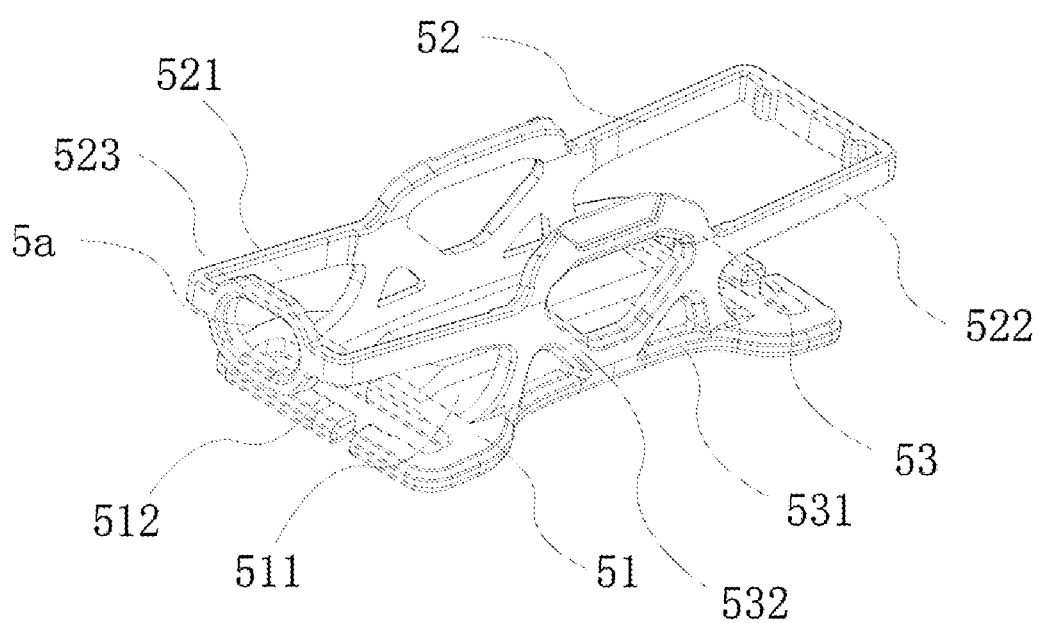
FIG. 3 is a schematic diagram of the structure of a fixed holder in an embodiment of the present disclosure.

As shown in FIG. 1, FIG. 2, and FIG. 3, connection arrangement for a power supply and a power wire of a split type headlamp includes a headlamp 1, a headlamp band 2, the power supply 3, the power wire 4, and a fixed holder 5, where the headlamp 1 and the fixed holder 5 are both disposed on the headlamp band 2, the power supply 3 is provided with a power supply port 31 and a clamping slot 32, the power supply 3 is detachably disposed on the fixed holder 5, the fixed holder 5 is provided with a through hole 5a, a first end of the power wire 4 is connected to the headlamp 1, a second end of the power wire 4 can be in a detachable connection with the power supply port 31 after passing through the through hole 5a, an elastic buckle 6 is disposed at an outer side of the second end of the power wire 4, and the elastic buckle 6 can cross the fixed holder 5 and then snap into the clamping slot 32.

Embodiment 1

In this embodiment, the fixed holder 5 includes a base 51 and a fixed frame 52, the base 51 is disposed on the headlamp band 2, the fixed frame 52 is disposed on the base 51, the power supply 3 is detachably disposed inside the fixed frame 52, and the through hole 5a is reserved in the fixed frame 52.

Elastic clamping portions 53 are provided on both sides of a middle part of the base 51, and the elastic clamping portions 53 are configured to fix a battery in the fixed frame 52.

In order to further lighten the entire structure and thus improve the user experience, a first hollow hole 531 is formed in the elastic clamping portions 53, and outer frames of the elastic clamping portions 53 have triangular-like structures; and two symmetrical connecting rods 532 are disposed inside the first hollow hole 531, and two ends of the connecting rods 532 are respectively connected to an inner wall of the first hollow hole 531, forming three groups of triangular stable structures with the outer frames of the elastic clamping portions 53, which increases the overall stability.

As shown in FIG. 3, the fixed frame 52 and the elastic clamping portions 53 are configured to limit the horizontal position of the power supply 3, top ends of the elastic clamping portions 53 are bent towards a middle part of the base 51, the power supply 3 is limited within the fixed frame 52 by means of the two elastic clamping portions 53, and the vertical position of the power supply 3 is limited by means of the base 51 and the elastic clamping portions 53, so that the power supply 3 is fixed.

In order to further lighten the fixed holder, the base is provided with a plurality of second hollow holes; and two connecting buckles 512 are disposed on an outer side of the base 51, and the connecting buckles 512 are configured to achieve a connection with the headlamp band 2.

Figure 4:
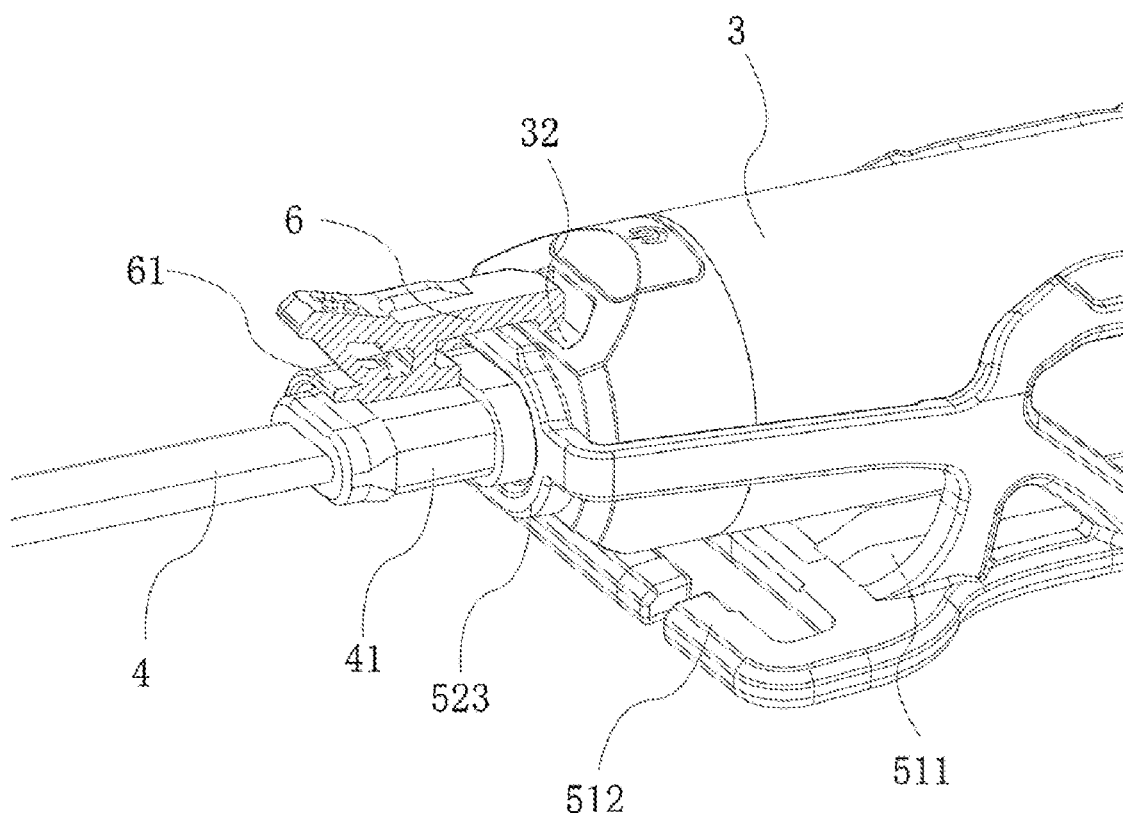
FIG. 4 is a partial cross-sectional view of an embodiment of the present disclosure.
Figure 5:
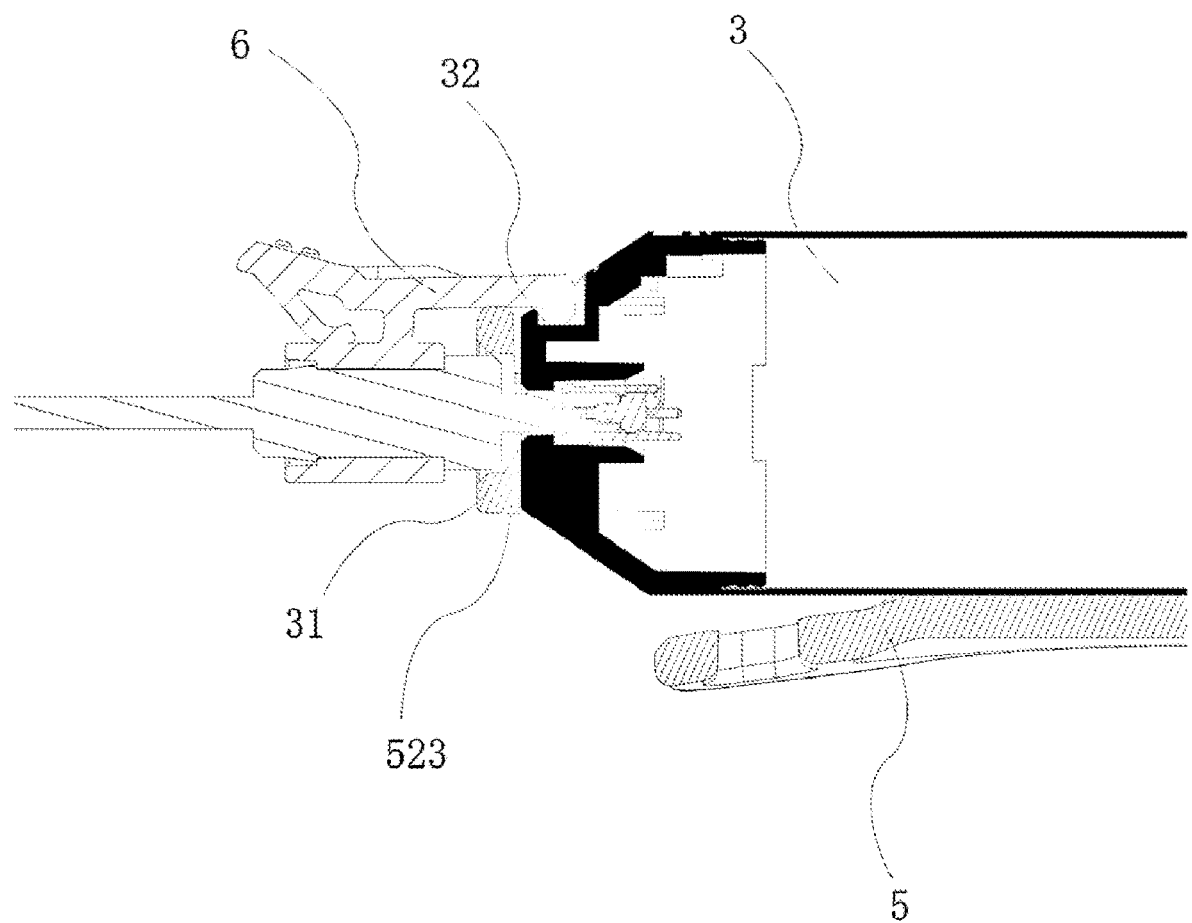
FIG. 5 is a cross-sectional view of an embodiment of the present disclosure.

When in use, the power supply 3 is clamped into the two elastic clamping portions 53 and placed into the fixed frame 52 to install the power supply 3 onto the fixed holder 5, the second end of the power wire 4 passes through the through hole 5a, and the elastic buckle 6 is enabled to cross the fixed frame 52 and engage with the clamping slot 32, as shown in FIG. 4 and FIG. 5, so that the connection between the power wire 4 and the power supply 3 is completed.

The headlamp of this embodiment is mostly used for outdoor sports, which is small in overall size and light, thus being capable of improving the user experience. The integrated battery of the commonly used battery compartment is relatively large in volume and thus is easy to shake during intense exercise, causing discomfort to the head. A solution to such shaking is to further add a fixing structure, but it will cause the overall head covering to be more bulky, increasing the weight and head load. Compared with the integrated battery, according to the solution in this embodiment, the battery can be replaced and charged separately, so that the headlamp of this embodiment can be used as long as the battery is available for replacement, while the integrated structure needs to consider the problem of battery life.

Embodiment 2

The structure of this embodiment is approximately the same as that of Embodiment 1, and the difference lies in the improvement of the structure of the fixed frame 52. In this embodiment, as shown in FIG. 3 (in the figure, the left side is the front, and the right side is the rear), the fixed frame 52 includes a first half frame 521 and a second half frame 522, and the first half frame 521 and the second half frame 522 are disposed on the elastic clamping portions 53. The first half frame 521 is disposed at front sides of the two elastic clamping portions 53, and the second half frame 522 is disposed at rear sides of the two elastic clamping portions 53. A power supply port fixing position 523 is provided on the first half frame 521, and the through hole 5a is reserved in a middle part of the power supply port fixing position 523.

After the power supply 3 is placed in the fixed holder 5, the power supply port 31 will be aligned with the through hole 5a.

Embodiment 3

In order to facilitate the installation of the elastic buckle 6 on the power wire 4, as shown in FIG. 2, a mounting groove 41 is formed at the outer side of the second end of the power wire 4, the elastic buckle 6 is disposed on a fixing sleeve 61, and the fixing sleeve 61 is matched with the mounting groove 41. The fixing sleeve 61 is sleeved inside the mounting groove 41, so that the elastic buckle 6 is fixed at the outer side of the second end of the power wire 4.

The above descriptions are examples of the best embodiments of the present disclosure, and the parts not described in detail are common general knowledge known by those skilled in the art. The scope of protection of the present disclosure is subject to the content of the claims, and any equivalent variation based on the technical enlightenment of the present disclosure still fall within the scope of protection of the present disclosure.

What is claimed is:

1. Connection arrangement for a power supply and a power wire of a split type headlamp, comprising a headlamp, a headlamp band, the power supply, the power wire, and a fixed holder, wherein the headlamp and the fixed holder are both disposed on the headlamp band,
   the power supply is provided with a power supply port and a clamping slot, the power supply is detachably disposed on the fixed holder,
   the fixed holder is provided with a through hole,
   a first end of the power wire is connected to the headlamp, a second end of the power wire is in a detachable connection with the power supply port after passing through the through hole, an elastic buckle is disposed at an outer side of the second end of the power wire, and the elastic buckle can cross the fixed holder and then snap into the clamping slot.

2. The connection arrangement for the power supply and the power wire of the split type headlamp according to claim 1, wherein the fixed holder comprises a base and a fixed frame, the base is disposed on the headlamp band, the fixed frame is disposed on the base, the power supply is detachably disposed inside the fixed frame, and the through hole is reserved in the fixed frame.

3. The connection arrangement for the power supply and the power wire of the split type headlamp according to claim 2, wherein elastic clamping portions are provided on both sides of a middle part of the base, and the elastic clamping portions are configured to fix a battery in the fixed frame.

4. The connection arrangement for the power supply and the power wire of the split type headlamp according to claim 3, wherein the fixed frame comprises a first half frame and a second half frame, and the first half frame and the second half frame are disposed on the elastic clamping portions.

5. The connection arrangement for the power supply and the power wire of the split type headlamp according to claim 4, wherein a power supply port fixing position is provided on the first half frame, and the through hole is reserved in a middle part of the power supply port fixing position.

6. The connection arrangement for the power supply and the power wire of the split type headlamp according to claim 3, wherein a first hollow hole is formed in the elastic clamping portions, and a plurality of connecting rods are disposed inside the first hollow hole; and outer frames of the elastic clamping portions and the connecting rods form a plurality of triangular-like frame structures.

7. The connection arrangement for the power supply and the power wire of the split type headlamp according to claim 6, wherein the outer frames of the elastic clamping portions are in triangular-like shapes.

8. The connection arrangement for the power supply and the power wire of the split type headlamp according to claim 2, wherein the base is provided with a plurality of second hollow holes.

9. The connection arrangement for the power supply and the power wire of the split type headlamp according to claim 2, wherein two connecting buckles are disposed on an outer side of the base, and the connecting buckles are configured to achieve a connection with the headlamp band.

10. The connection arrangement for the power supply and the power wire of the split type headlamp according to claim 1, wherein a mounting groove is formed at the outer side of the second end of the power wire, the elastic buckle is disposed on a fixing sleeve, and the fixing sleeve is matched with the mounting groove.

* * * * *